J. HATFIELD.
Machine for Computing Interest.
No. 3,574. Patented May 6, 1844.
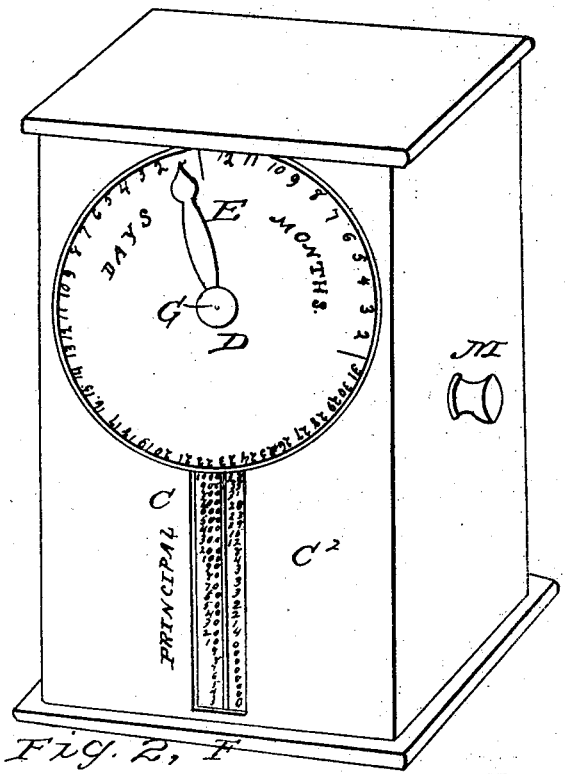
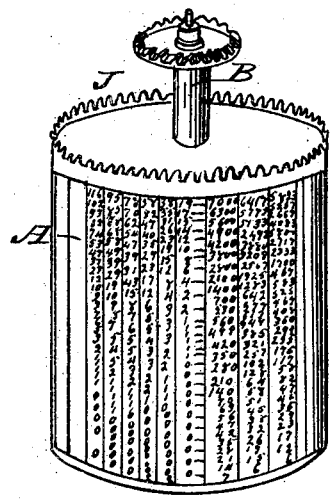
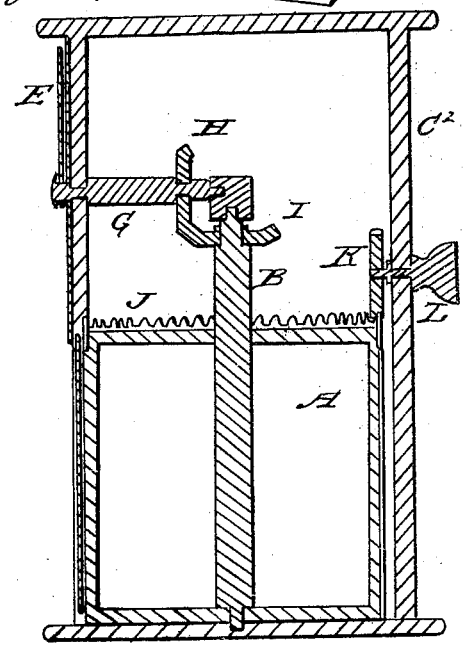
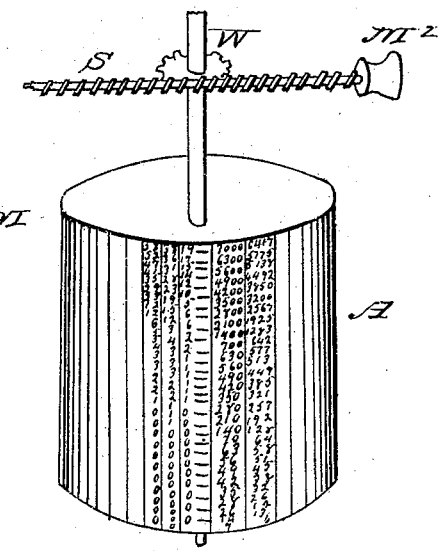

UNITED STATES PATENT OFFICE.

JEHU HATFIELD, OF GLENS FALLS, NEW YORK.

MACHINE FOR CALCULATING INTEREST.

Specification of Letters Patent No. 3,574, dated May 6, 1844.

*To all whom it may concern:*

Be it known that I, JEHU HATFIELD, of Glens Falls, in the county of Warren and State of New York, have invented a new and useful Machine for Computing Interest, Measuring Lumber or Wood, and for other Purposes, which is described as follows, reference being had to the annexed drawings of the same, making part of this specification, of which—

Figure 1 is a perspective view of the machine. Fig. 2 ditto of the revolving cylinder; Fig. 3, a vertical section. Fig. 4 represents a screw for turning the cylinder.

This machine consists of a revolving cylinder A on a vertical axle B having on its outer surface or circumference vertical parallel columns of figures or signs representing the interest on the several sums or principal shown in a stationary column C or table in front of a case $C^2$ effected by simply turning said cylinder, there being also a circular scale D made of pasteboard or other suitable material placed in a vertical position on the front of the case $C^2$, showing the days and months and an index E to point out the days and months. The case C is of a rectangular form having a vertical opening or slit F in front through which the figures on the cylinder representing the interest, are seen. The scale C showing the principal is placed on one side of said opening on the front of the case. The circular scale or dial D is placed above the last named vertical scale. The axle G of the index or pointer is in the center of the dial extending into the case having on its opposite extremity a bevel cog wheel H which works into a horizontal bevel wheel I on the upper end of the axle B of the cylinder, the aforesaid cylinder, scale or dial and gearing being so adjusted and arranged as to bring the pointer to the day or month shown on the dial and at the same time the interest on the cylinder to the opening in the case opposite the principal the interest of which is desired to be known. The cylinder may be turned by hand by a circle of teeth or cogs J on its uper end into which is made to engage a pinion K on a horizontal shaft L extending through the case with a knob M by which it is turned, or by means of a screw S working into the teeth of the cylinder— or a cog wheel W on the shaft of the cylinder,—as represented in Fig. 4.

The operation of this improved machine is as follows. When it is required to find the interest of any given sum, take hold of the knob M and turn the axle L to the right or left—this will bring the index or pointer E to the day or month of the dial or scale D desired. At the same time the interest will be indicated on the cylinder A to the right of the principal, shown in the permanent scale C on the case, by the former being on a horizontal line with the latter.

In the old revolving interest table there was a cylinder containing the interest, having the days and months stated at the head of each column (instead of a dial and pointer) inclosed in a round pasteboard case or box, having an opening in front with the principal pasted at one side, the cylinder being made to revolve by turning the shaft at the lower end with the fingers, and therefore I wish it understood that I make no claim to any part of this arrangement but—

What I do claim as my invention and which I desire to secure by Letters Patent is—

The before described combination of the revolving cylinder A containing the vertical columns of numbers indicating the interest, with the permanent vertical scale C showing the principal, and the dial D, representing the days and months for which the interest is to be ascertained and the pointer E, operated in the manner and for the purpose set forth above, or in any other mode substantially the same by which analogous results are produced.

JEHU HATFIELD.

Witnesses:
HARMON VAN TAPEL,
R. M. WEST.